No. 766,948.

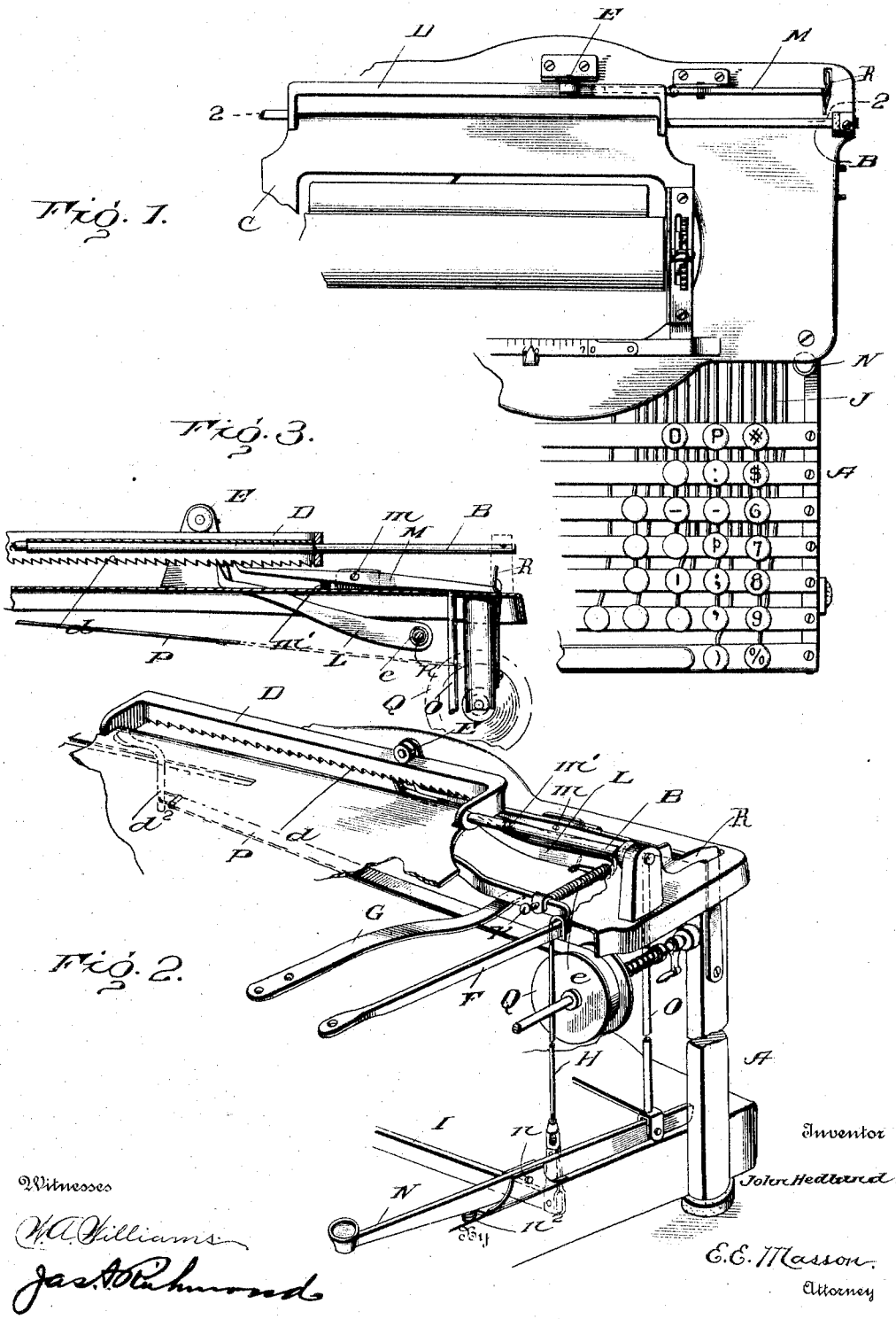

Patented August 9, 1904.

UNITED STATES PATENT OFFICE.

JOHN HEDLUND, OF ST. CLOUD, MINNESOTA.

TYPE-WRITER.

SPECIFICATION forming part of Letters Patent No. 766,948, dated August 9, 1904.

Application filed March 7, 1903. Serial No. 146,738. (No model.)

*To all whom it may concern:*

Be it known that I, JOHN HEDLUND, a citizen of the United States, residing at the city of St. Cloud, in the county of Stearns and State of Minnesota, have invented certain new and useful Improvements in Type-Writers, of which the following is a specification.

The principal objects of the invention are to provide positive mechanism for shifting the carriage from right to left, and thereby preventing the same from "sticking" or "jumping," and to provide for an automatic release and return of the carriage from left to right.

To these and other ends hereinafter stated the invention consists in the improvements presently to be described, and finally pointed out in the claims.

The nature, characteristic features, and scope of the invention will be more readily understood from the following detailed description, taken in connection with the accompanying drawings, forming a part hereof, wherein—

Figure 1 is a fragmentary top view of a type-writer with my invention applied. Fig. 2 is a perspective view of carriage shifting and releasing mechanism embodying features of my invention. Fig. 3 is a sectional elevational view of the rack and the locking and actuating pawls, the section being taken upon the line 2 2 of Fig. 1.

Referring to the drawings, A represents the usual frame of the machine, and B represents the rod or rail upon which travels the paper-cylinder carriage C. Said carriage is hinged on said rod between the bent ends of a rack D, the teeth $d$ of which are spaced in the well-known manner.

E is a friction-roller mounted in a stationary part of the frame and arranged to bear on the top of the rack and hold the same in operative relation with the carriage-shifting mechanism.

F represents the usual pivotal frame, under the tension of springs G, only one of which is shown, and connected, through the medium of connecting-rods H, with the cross-bar I, which is arranged to be depressed in the well-known manner by the key-levers J. The pivotal or rocking frame F is secured to the main frame by screws or bolts (not shown) passing through its apertured ends and has sufficient vertical play thereon as not to interfere with its proper up-and-down movement. Near the right of the frame F and extending rearwardly thereof there is provided a pin or projection K, which carries at its end what may be termed an "actuating-pawl" L, that is normally solicited upward by means of a coil-spring E, so that when the frame F is depressed by the levers J through the medium of the cross-bar I and connecting-rods H said pawl is momentarily disengaged from the rack and solicited backward by its spring $e$ and when the frame F is released and has returned to its normal position under the strain of springs G engages the next adjacent rearward tooth $d$ of the rack and imparts a positive movement forward to the rack and carriage the space of one tooth.

In order to preclude a retrograde movement of the carriage while the actuating-pawl L is momentarily disengaged to act upon the next tooth, I provide a locking member or pawl M, pivoted, as at $m$, to a stationary part of the machine and normally solicited into engagement with the teeth $d$ of the rack by a spring $m'$, the resistance of which is easily overcome by the pawl L when the latter is acting.

The means for releasing the carriage and shifting the same from left to right comprise a shift-key N, pivoted, as at $n$, to a stationary part of the frame and normally solicited upward at its front end by a spring $n^2$. The rear end of the shift-key carries an upright member or rod O, which when the key is depressed moves upward and trips the pawl M, which in turn trips or releases the pawl L, whereby the carriage is rendered free to return. For the sake of illustration I have shown a tape P interposed between a hook-like terminal of the bent end $d^2$ of the rack and a spring-barrel Q, projecting from a stationary part of the frame, the tension of which spring effects the return of the carriage. A flat spring R or its equivalent is employed to hold the pawl M out of engagement with the rack when the shift-key is operated, said spring being arranged to be engaged by the rack upon the return of the latter to release the pawl M.

It will be obvious to those skilled in the art to which the invention relates that modifications may be made in details without departing from the spirit and scope of the invention. Hence I do not limit myself to the precise construction and arrangement of parts hereinbefore referred to, and illustrated in the accompanying drawings; but, Having described the nature and objects of the invention, what I claim as new, and desire to secure by Letters Patent, is—

1. The combination of the main frame of the machine, the paper-cylinder carriage, its rack, a rocking frame secured relatively to the main frame and arranged to be depressed by the key-levers, a spring-pressed actuating-pawl carried by said rocking frame adapted for engagement with said rack for imparting a forward step-by-step movement to the carriage, a locking-pawl pivoted to the main frame at a point between said first-mentioned pawl and the rack for preventing a retrograde movement of the carriage, and a flat spring bearing against the end of said locking-pawl for holding it out of engagement with the rack when the shift-key is operated, the arrangement being such that the spring is adapted to be engaged by the rack upon the return of the latter to release the locking-pawl, substantially as described.

2. The combination of the main frame of the machine, the paper-cylinder carriage, its rack, a rocking frame secured relatively to the main frame and arranged to be depressed by the key-levers, said levers, a spring-pressed actuating-pawl carried by said rocking frame adapted for engagement with said rack for imparting a forward step-by-step movement to the carriage, a locking-pawl pivoted to the main frame and mounted relatively to said actuating-pawl and the rack for preventing a retrograde movement of the carriage, a flat spring bearing against the end of said locking-pawl and in the path of the rack, whereby upon the return of the rack said locking-pawl is tripped thereby tripping the actuating-pawl, and means for returning the carriage when the pawls are tripped, substantially as described.

In testimony whereof I affix my signature in presence of two witnesses.

JOHN HEDLUND.

Witnesses:
 HUBERT HANSEN,
 ANDREW C. ROBERTSON.